3,161,592
FILTER DISCHARGE APPARATUS
Arthur R. Dominguez, New York, N.Y., assignor to Suchar Sales Corporation, New York, N.Y., a corporation of New York
Filed Dec. 28, 1962, Ser. No. 248,089
5 Claims. (Cl. 210—331)

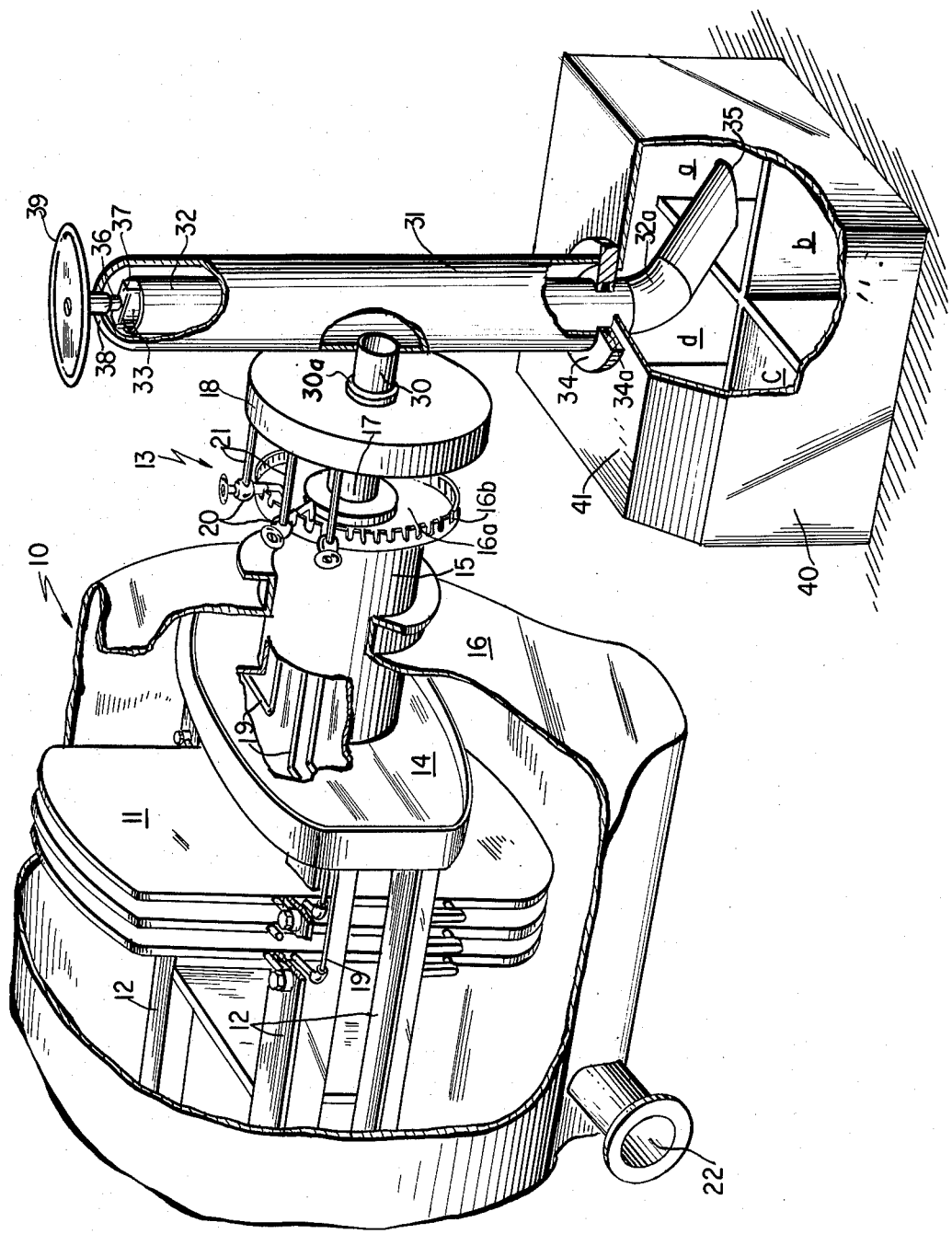

This invention relates generally to filter apparatus and, in particular, to a filter apparatus of the type comprising a shell containing filter leaves and into which a mixture of liquid and finely divided suspended solids is supplied for collection of the solids on the leaves and passage of the liquid through the leaves from where it is conducted to the exterior of the shell.

It is an object of the present invention to provide for a filter apparatus of the above described type an accessory device of novel construction which will facilitate the formation of a substantially uniform cake thickness over the entire area of the leaves, whereby to obtain a uniform quality of filtrate and reduce the amount of offgrade or muddy filtrate passed through the apparatus during the initial build up of the filter cake on the leaves.

Another object of the invention is to provide such a device which will serve also for the selective distribution of the liquid leaving the apparatus to various destinations depending upon its quality.

It is a further object to provide a device as above described which is simple in construction and operation and which may be readily applied to existing filter apparatus.

These and other objects and advantages of the invention will be apparent from the following detailed description of an illustrative embodiment of the invention and by reference to the accompanying drawing which is an isometric, fragmentary view of a filter apparatus embodying features of the invention.

Referring to the drawing, the filter apparatus shown therein includes rotary leaf filter of known type having a shell 10 which contains a plurality of vertical filter leaves 11. The leaves 11 are removably and rotatably supported within the shell in vertical disposition between beam members 12 forming a part of a rotary assembly 13. The assembly 13 further includes a cross member 14 interconnecting the beam members 12, a hollow shaft 15 extending from the cross member 14 and rotatably supported in and passing through an end wall 16 of the shell, a circular rack member 16a concentrically carried on the free end of the shaft 15 and having a crenelatted rim 16b, a shaft extension 17, and a cylindrical chamber 18 concentrically secured to the free end of shaft extension 17. Each filter leaf 11 comprises a rigid leaf over which is stretched a filter cloth of cotton or other suitable material, and a filtrate pipe 19 communicates with the interior of each leaf through a side edge thereof and extends therefrom along one of the beam members 12, along the cross member 14, through the hollow shaft 15 and through a crenel in the rim 16b to a shut-off valve 20. The filtrate from each leaf passes from the valve 20 of the corresponding pipe 19 through a sight glass 21 which leads the liquid into the chamber 18.

It will be seen that when a mixture of liquid and finely divided solids is supplied under pressure to the shell through a suitable inlet, such as is shown at 22, the suspended solids will collect on the exterior surface of the filter cloths to form a filter cake and the liquid will pass through the cloths and through the pipes 19 and sight glasses 21 into the chamber 18.

The valves 20 enable the attendant of the filter apparatus to put out of service any leaf that may fail to function properly and thereby prevent contamination of a liquid of desired quality with one not properly filtered.

In order to ensure that the cake forming on the filter leaves will be of substantially uniform thickness over the entire area of the leaves, provision is made to prevent the discharge of any liquid from the apparatus until such time as the liquid in the shell completely covers all of the filter leaves. This is accomplished according to the present invention by means of the structure shown in the drawing to the right of the chamber 18.

This new structure includes a stationary pipe 30 aligned with the rotational axis of the assembly 13 and communicating at one end with the interior of the chamber 18, suitable sealing means 30a providing a liquid seal between the rotating chamber 18 and the stationary pipe 30, a stationary vertically elongated pipe or tube 31 communicating with the other end of the pipe 30 and providing a riser chamber into which the liquid is delivered by the pipe 30, and a delivery pipe 32 disposed concentrically within and spaced from the tube 31.

The pipe 32 has an open upper end 33 at a level at least as high as the top level of the filter leaves 11 and extends downwardly from that end, and through a base plate 34 closing the lower end of the tube 31, to a delivery outlet 35 provided by the open lower end of the pipe 32 below the tube 31. It will be seen that, with this arrangement, no free discharge of liquid from the filter can occur until the level of the liquid within the tube 31 has risen to the level of the top of the leaves; hence, the entire area of each leaf is submerged and uniformly subjected to the liquid in the filter shell, hence to the uniform building up of a cake on the filter cloths, before the filtrate is free to leave the apparatus. It results that the filter cake forms more uniformly over the entire area of the leaves, whereby to ensure a more uniform quality of filtrate, and a reduced amount of offgrade or muddy filtrate is passed through the apparatus during the filling of the filter shell with the liquid to be filtered at the start of a filtration cycle.

Since the liquid being discharged from the apparatus will differ in quality and content at different stages of the cycle of operation of the filter apparatus, it is important to be able easily to distribute the various grades of liquid to different destinations. This is accomplished according to the invention by disposing the discharge outlet 35 of the delivery pipe 32 in a position where it leads to one side of the axis of the pipe 32 and by providing means for rotating the pipe 32 about its axis so as to vary the position of the discharge outlet and thereby the location to which liquid flowing downwardly through the pipe 32 is directed.

In the embodiment shown, a portion 32a of the pipe 32 disposed below the tube 31 and leading to the discharge outlet 35 extends at an angle to the pipe axis to offset the outlet 35 relative to that axis, and a stub shaft 36 is fixed, as by a bracket 37, to the upper end of the pipe 32 and extends through the closed upper end 38 of the tube 31 to a handle member in the form of a handwheel 39 coaxially secured to the upper end of the shaft 36. Thus, upon rotation of the handwheel 39 by an attendant of the apparatus, the pipe 32 will be rotated in the upper and lower bearing surfaces respectively provided by the closed tube end 38 and the plate 34, and the discharge outlet 35 will be moved through a circular path concentric with the pipe axis. Suitable means such as a gland 34a carried on the base plate 34 provide a seal preventing the escape of liquid between the rotatable pipe 32 and that plate.

In order to collect the liquid issuing from the outlet 35 and distribute it to desired destinations, a receptacle 40 is provided having a top wall 41 through which the delivery pipe 32 extends, and having a plurality of horizontally separated upwardly opening compartments $a$, $b$, $c$ and $d$ located beneath the path of movement of the pipe outlet 35.

In a typical operating cycle of the filter apparatus, a liquid precoating suspension is first supplied to the filter to collect suspended particles on the filter cloths to form a coating thereon, the remainder of the suspension passing through the leaves for delivery to a compartment, for example, the compartment a, selected according to the position of the outlet 35. The precoating suspension delivered to the compartment a is then directed from that compartment back to the filter for recirculation therethrough, the recirculation being continued until a clear liquid is delivered from the outlet 35, indicating that substantially all of the suspended particles have been deposited on the filter leaves. The filter is now ready to enter the working phase of the cycle. The liquid to be filtered is admitted into the shell and the muddy or off-grade filtrate initially delivered by the filter apparatus while a filter cake is forming on the leaves is directed, for example, into the compartment b by turning handwheel 39 so as to dispose the outlet 35 over that compartment. As the cake of solids builds up on the filter cloths, the filtrate becomes of commercially acceptable clarity, whereupon the handwheel 39 is turned to dispose the outlet 35 over the compartment c for delivery of the clear filtrate into that compartment. The filtration process continues until the filter cake has reached a maximum desired thickness, following which the filter cake on the leaves is washed to extract soluble substances from it, and the resulting wash solution is directed by further turning of the handwheel into the compartment d.

It will be seen that the present invention provides a simple device for use in a leaf filter apparatus, which gives important practical advantages in fulfillment of the objects above stated.

While the invention has been illustrated and described with reference to numerous details of the construction and operation of an illustrative embodiment, it is to be understood that the new features of this invention may be utilized in various other ways and are not restricted to the illustrative embodiment except as may be required by a fair construction of the appended claims.

What is claimed is:

1. In a filter apparatus comprising a shell containing filter leaves and into which a mixture of liquid and finely divided suspended solids is supplied for collection of the solids on said leaves and passage of the liquid through said leaves, there being conduit means extending from said shell for conducting therefrom the liquid passed through the leaves; a riser chamber connected with said conduit means, a pipe opening in said chamber at a level at least as high as the top of said leaves and extending downwardly therefrom within, and through the bottom of, said chamber to an outlet of the pipe disposed below said chamber and leading to one side of the axis of said pipe, and means for rotating said pipe about said axis whereby to vary the position of said outlet relative to said chamber and thereby the location to which liquid flowing from the shell is directed.

2. A filter apparatus as claimed in claim 1, a portion of said pipe below said bottom and leading to said outlet extending at an angle to said axis to offset said outlet relative to said axis.

3. In a filter apparatus comprising a shell containing filter leaves and into which a mixture of liquid and finely divided suspended solids is supplied for collection of the solids on said leaves and passage of the liquid through said leaves, there being conduit means extending from said shell for conducting therefrom the liquid passed through the leaves; a vertically elongated tube having closed ends and connected intermediate its ends with said conduit means, a pipe passing through, and mounted for rotation about its axis in, the lower end of said tube and extending upwardly from said lower end within said tube to an open upper pipe end at a level at least as high as the top of said leaves, said pipe extending downwardly from said lower end to a pipe outlet disposed below the tube, a portion of said pipe below said tube extending at an angle to said axis to offset said outlet relative to said axis, a shaft fixed to the upper end of said pipe and extending through the upper end of said tube, and means secured to said shaft above said tube for rotating the pipe about its axis to vary the position of said outlet and thereby the location to which liquid flowing from the shell is directed.

4. A filter apparatus as in claim 3, and a receptacle having a plurality of horizontally separated upwardly opening compartments located beneath the path of movement of said outlet for collecting the liquid and distributing it to any of a plurality of destinations selected according to the position of said pipe.

5. A filter apparatus as claimed in claim 3, said pipe rotating means being a handle member secured to said shaft.

References Cited by the Examiner
UNITED STATES PATENTS

| | | | |
|---|---|---|---|
| 248,575 | 10/81 | Burkhardt | 210—307 |
| 2,714,955 | 9/55 | Marston | 209—158 X |
| 3,019,905 | 2/62 | Baker et al. | 210—347 X |

HARRY B. THORNTON, *Primary Examiner.*

FRANK W. LUTTER, *Examiner.*